United States Patent [19]
Hofstetter et al.

[11] Patent Number: 5,139,724
[45] Date of Patent: Aug. 18, 1992

[54] METHOD AND APPARATUS FOR INJECTION MOULDING BLANKS

[75] Inventors: Otto Hofstetter; Luis Fernandez, both of Uznach, Switzerland

[73] Assignee: Otto Hofstetter AG, Switzerland

[21] Appl. No.: 459,798

[22] PCT Filed: Sep. 29, 1989

[86] PCT No.: PCT/CH89/00178
§ 371 Date: Mar. 21, 1990
§ 102(e) Date: Mar. 21, 1990

[87] PCT Pub. No.: WO90/03876
PCT Pub. Date: Apr. 19, 1990

[30] Foreign Application Priority Data
Oct. 5, 1988 [DE] Fed. Rep. of Germany ....... 3833868

[51] Int. Cl.$^5$ ............ B29C 45/03; B29C 45/20; B29C 45/72
[52] U.S. Cl. ............ 264/101; 264/328.9; 264/328.15; 264/328.16; 264/537; 425/533; 425/548; 425/549; 425/552
[58] Field of Search ........... 264/328.9, 328.13, 328.14, 264/328.15, 328.16, 297.2, 537, 538, 101; 425/547, 548, 549, 552, 568, 533

[56] References Cited
U.S. PATENT DOCUMENTS 4,213,751 7/1980 Fernandez ............... 425/566
4,378,963 4/1983 Schouenberg ........... 425/549

FOREIGN PATENT DOCUMENTS 99089 1/1984 European Pat. Off. .
106922 5/1984 European Pat. Off. .
3116313 4/1982 Fed. Rep. of Germany .
3431173 3/1986 Fed. Rep. of Germany .
2394231 1/1979 France .
2069924 9/1981 United Kingdom .

OTHER PUBLICATIONS

*Injection Molding Handbook*, Rosato, editor, 1988, pp. 292–297.

Primary Examiner—Jan H. Silbaugh
Assistant Examiner—Catherine Timm
Attorney, Agent, or Firm—Handal & Morofsky

[57] ABSTRACT

The method is used to process a synthetic moulding compound which crystallizes within a specific temperature range. In order to prevent milkiness in the blank to be produced, the moulding compound is chilled. The method prevents such milkiness, at least in the gate area of the blank, by keeping all of the moulding compound, during the operating cycle, as far as the gate area, at a temperature which is above the temperature $T_{CC}$ below which the moulding compound begins to crystallize. A gate system, which may be used to carry out the method, uses, in the interior of the injection nozzle, a strongly heat conducting nozzle core, a strongly heat conducting area in the immediate vicinity of the gate opening, and a gap for heat insulation of the nozzle tip, the nozzle core and the moulded body.

7 Claims, 2 Drawing Sheets

METHOD AND APPARATUS FOR INJECTION MOULDING BLANKS

The present invention relates to a method for injection moulding blanks, especially preliminary blanks suitable for inflation moulding. In particular, the invention relates to a method in which a crystallizable synthetic moulding compound, which is first heated to a temperature $T_H$ in the vicinity of the crystalline melting temperature $T_M$, is pressed from a heated injection moulding nozzle through a gate opening into a cold mould. The method is especially useful for moulding preliminary blanks suitable for inflation stretching from chilled crystallizable synthetic moulding compounds in association with a coolable moulding apparatus having a heatable nozzle consisting of a body and a tip, the tip comprising a nozzle mouth, the coolable mould forming a mould cavity consisting of an outer mould and an inner mould, the outer mould comprising a gate opening, and the nozzle mouth and gate opening being substantially in alignment with each other.

PET (polyethylene terephthalate) material is very sensitive to processing, especially to processing temperatures. If the processing temperature is too low, crystalline zones occur, giving rise to streaks in injection moulded blanks, especially when the blanks are inflation stretched. On the other hand, if the temperature is too high, an undesirable amount of acetaldehyde is produced, and if PET inflation stretched containers are used for delicately flavoured food products, the acetaldehyde impairs the flavour of such products.

The special properties of crystallizable synthetic moulding compounds known to the expert will be dealt with hereinafter, using PET as an example, as far as they are essential to the present invention, in order to clarify problems arising during the processing of this material.

PET is a thermoplastically processable polymer which is very hard and rigid at room temperature. PET is, therefore, a preferred material for thin walled bottles. There are essentially three basic types of polymers: a) amorphous polymers with a completely random arrangement of molecule, such as PVC or glass, characterized in that they become softer and softer with increasing temperature; b) so called "crystalline" polymers whose molecules are carefully aligned and which, therefore, have a relatively sharp melting point, such as polybutylene terephthalate, linear polyethylene, or ice; and c) so called "crystallizable" polymers which may be either amorphous or crystalline at room temperature and in which the degree of crystallinity can be controlled. PET pertains to this last group.

It is typical of PET that it exhibits "crystallinity" only at a specific temperature above which leads to milkiness. This temperature range is defined at its lower limit by the minimal temperature for crystallization by heating ($T_{CH}$), at its upper limit by the maximal temperature for crystallization by cooling ($T_{CC}$), and at its between glass transition temperature ($T_G$) and melting temperature ($T_M$). A typical glass transition temperature is about 80° C., and a typical melting temperature is between 250° and 255° C. The rate at which crystallinity forms is temperature dependent and is very slow, both in the vicinity of the minimal temperature $T_{CH}$ and of the maximal temperature $T_{CC}$.

A detailed description of the behaviour of PET may be found in "A Layman's Guide to PET Chemistry and Processing", EDWARD E. DENISON; 4th Annual International Conference on Oriented Plastic Containers; Mar. 25, 1981.

In casting PET blanks, and especially preliminary blanks for subsequent inflation stretching, it is usual to inject the PET material, which has been rendered pressure-conveyable by heating to a suitable temperature, through a nozzle and the gate opening in the outer mould into a mould. As soon as the mould is filled, the nozzle, or the passage between the nozzle and the mould, is usually closed by a mechanically operated element, such as a nozzle needle. Thereafter, the blank, usually with the countermould, is lifted from the outer mould and gate opening. The closing of the gate opening, or of the passage between the nozzle and the mould, by the mechanically operated needle in the nozzle means that PET material under pressure in the nozzle at the conclusion of the filling operation cannot continue to flow. An apparatus of this kind is described in U.S. Pat. No. 4,213,751, for example.

However, the provision of such closing elements as the needle in the nozzle is costly, because due to the sensitivity of the material to be processed, the needle must be designed in such a manner as to avoid additional stressing of the PET material pressed into the mould, for example, by additional friction, since this can lead to an increase in acetaldehyde formation. Care must also be taken to ensure accurate guidance of the needle during lengthy idle periods. The tip of the needle, in particular, is cooled very quickly upon closing and this leads to milkiness in the PET material.

In order to eliminate the disadvantages of nozzles having mechanically operated closing elements, attempts were made to design such gate systems "without needles", but it has so far been impossible to obtain satisfactory results. When the blank is lifted from the outer mould, it draws a thread to the nozzle, usually centrally of the gate opening. After this thread crystallizes, it breaks and remains in the mould, from which it must be removed before another blank can be cast. Furthermore, the runners on the blanks must be made relatively long in order to form, in the usually cooled outer mould, a relatively long zone where the PET material introduced into the mould can solidify to a crystalline structure. When the mould is removed, this material breaks off at a weak spot. These relatively long runners must be removed in a separate operation, for instance, before the preliminary blank is inflation stretched.

It is the purpose of the present invention to provide a method of the type mentioned which will eliminate the abovementioned disadvantages.

Accordingly the invention provides a method for injection molding hollow thermoplastic blanks suitable for subsequent inflation stretching which method employs a crystallizable synthetic thermoplastic polymer and comprises the steps of:

a) heating the polymer to a temperature enabling it to flow under pressure;

b) forcing the molten polymer under pressure from an injection molding nozzle into a cooled mold through a gate opening in the said mold to form a blank said molding nozzle and cooled mold mating at said gate opening for the transfer of heated polymer therebetween; and c) separating the blank from the molding nozzle at said gate opening in a manner such that the blank is formed with a separation runner;

wherein the mold is cooled to prevent polymer crystallization and the method further comprises:

d) the use of an unclosable nozzle core around which the molten polymer can flow which nozzle core is heated to have a heated transverse polymer-engaging end face in the vicinity of said gate opening;

e) holding said heated nozzle core stationary in relation to said nozzle; and f) depressurizing said polymer to interrupt polymer flow through said gate for separation of the blank;

whereby the method can provide a substantially clear blank, substantially free of polymer crystallization in the vicinity of said runner which blank also has a substantially thread-free runner as it leaves said nozzle.

In another aspect the invention provides apparatus for injection molding hollow thermoplastic blanks from a hot flowable, crystallizable synthetic thermoplastic polymer said blanks being suitable for subsequent inflation stretching, which apparatus includes:

a heatable unclosable nozzle comprising an annular nozzle body having a nozzle tip through which said hot polymer can be forced under pressure and a nozzle core arranged within said nozzle body and having an end face in the vicinity of the nozzle tip, said end face of the nozzle core defining with the nozzle tip a normally unclosable flow path for the hot polymer therebetween, at least said nozzle tip and said nozzle core having a high heat conductivity;

heat source means connected to said nozzle tip and said nozzle core to maintain said nozzle tip interior and said nozzle core end face heated;

a coolable mold assembly having an outer mold provided with a gate opening and an inner mold forming a mold cavity with said outer mold said gate opening being alignable with said nozzle to receive polymer therefrom into the mold cavity, said outer mold further having a high thermal conductivity region in the vicinity of the gate opening which region is connected to a heat sink to cool the mold;

means to hold the nozzle core stationary relative to the nozzle tip during the molding of blanks; and depressurization means to interrupt the flow of hot polymer through said gate opening for the separation of a blank from the polymer stream;

whereby said apparatus can provide a substantially clear blank, formed with a substantially thread-free runner as it leaves said nozzle which blank is substantially free of polymer crystallization in the vicinity of said runner.

According to this, the material is pressed into the mould in a tubular flow, so that, in the central area, tending primarily to thread drawing, the previously disc-shaped flow of material is tied structurally to the mould. After the mould has been filled, the material in the nozzle is depressurized so that, when the blank and its runner are removed, no material can flow from the nozzle into the mould.

In order to ensure, at this time, rapid hardening of the blank and, at the same time, to prevent PET material on the nozzle side from hardening, the zone in which the PET material begins to crystallize is minimized by suitable means.

In the case of PET blanks produced by conventional casting methods and comprising a needle moving axially in the nozzle for the purpose of closing the gate opening and separating the material in the nozzle from the runner to be removed from the blank, a crystalline area forms in the gate area of the blank coaxially with the gate opening and with the runner, which crystalline area extends through the wall of the blank. This can be recognized, for example, by the difference in light transmission between this crystalline area and the remaining wall sections. In an otherwise transparent wall, this crystalline area has a milky appearance.

Using the method according to the invention makes it possible for the first time for the wall area of the blank in the immediate area of the gate not to be crystalline, i.e., the method according to the invention produces an injection moulded blank the wall of which is substantially homogeneous, and therefore, transparent even in the gate area.

This has the advantage that preliminary blanks subjected to subsequent processing, such as inflation stretching, to be used in producing pressurized containers, have no non-homogeneous zone in the gate area which behaves differently during the subsequent processing and, in the case of a finished container, may form a zone which cannot withstand pressure.

Moreover, the method according to the invention produces an injection moulded blank the runner of which is box-like, it being possible to make the axial extension thereof substantially the same as, or smaller than, the outside diameter thereof. In many cases, this eliminates the need for subsequent separation of the runner, even if the blank is to be subjected to subsequent inflation stretching.

A gate system of this kind according to the invention is further characterized in that the nozzle comprises a stationary, centrally arranged core in the interior of the nozzle body, which core extends into the nozzle outlet without closing it. The nozzle tip and core have high thermal conductivity and are connected to heat sources. The outer mould area located in the immediate vicinity of the gate opening has high thermal conductivity and is connected to heat sinks. The nozzle tip and outer mould are spaced from each other by an annular gap and are heat insulated, and the gate opening widens out to the surface of the outer mould.

Since the flow cross section of the nozzle in the outer mould is at least sectionally annular, and a central stationary core is provided, this ensures that, in the special area tending to thread drawing, there is no flow of material at all.

The core preferably projects into the transition area between the nozzle and the outer mould, so that the flow of material releases itself first from the central core before emerging into the mould, and becomes a homogenous flow only directly on a level with the surface of the outer mould, before flowing into the mould.

Moreover, due to the stationary core, the relatively thin walled, box-like design of the runner of the blank makes it easier to break off the runner upon releasing the blank than when the runner is of the known solid type.

In order to disconnect the nozzle outlet area, in which the PET material is kept continuously fluid, from the gate area in the outer mould, wherein in each blank producing cycle the runner is to harden before the blank is removed, an annular gap extending substantially radially outwardly is provided between the outer mould and the nozzle, the annular gap being at least partly filled with PET material. This ensures an additional thermal disconnection between the outer mould and the mouth of the nozzle.

According to a preferred variant of the invention, the flow cross section, on a level with the stationary central core, is circular.

In order to ensure that the gate on the blank side hardens relatively quickly, whereas the PET material remaining in the nozzle stays fluid, a hot block or a specially provided heating of the tool is the source of heat. The nozzle and the central core in particular are connected together in good thermal conductivity, whereas the outer mould, and thus the wall of the gate opening, are connected in good thermal conductivity by means of a heat sink, preferably in the form of water cooling.

Another arrangement according to the invention is the geometrical design of the gate system, more particularly, the widening of the gate opening at the surface of the outer mould.

The invention is explained hereinafter in conjunction with the drawings attached hereto, wherein.

Figure 1:
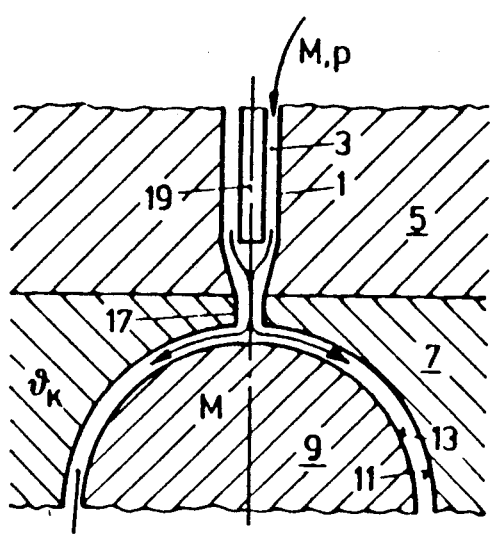
FIG. 1a is a diagrammatical longitudinal section through a known gate system with a mobile nozzle needle, in the casting position.
FIG. 1b shows the arrangement according to FIG. 1a upon removal of the cast blank with runner.
Figure 1:
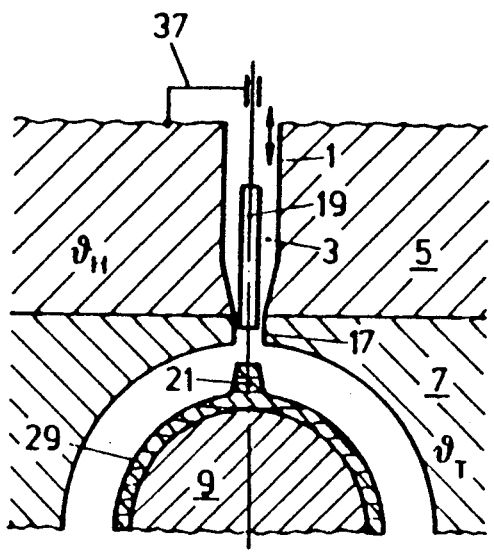

FIG. 1 is a diagrammatical representation of a known gate system comprising a nozzle 1. The nozzle 1 communicates with feed lines from a hot block through which, as shown by arrow M, PET material, heated so that it flows, is delivered under pressure. A nozzle block 5, with the nozzle 1, is secured to an outer mould 7 with which a core 9 cooperates to produce preliminary blanks. Exposed between an outer surface 11 on the outer mould 7 and inner mould surface 13 on the core 9 is a mould cavity 15 for the production of blanks or preliminary blanks. The nozzle chamber 3 communicates with the mould cavity 15 through a gate opening 17, which opens out into the outer mould surface 11. Arranged coaxially in the nozzle chamber 3 is an axially displaceable nozzle needle 19, the axial movement of which is controlled by a drive element not shown. In the configuration illustrated in FIG. 1a, the nozzle needle 19 is drawn back leaving the passage from the nozzle chamber 3 through the gate opening 17 and into the mould cavity 15 free. In the casting position, the PET material, heated to a fluid condition, is pressed through the nozzle chamber 3 and finally into the mould cavity 15. The material flowing all around the withdrawn nozzle needle 19 is united in the vicinity of the gate opening 17 into a closed cylindrical flow.

As soon as the mould cavity 15 is full, the nozzle needle 19 is advanced, as shown in FIG. 1b, and the passage between the nozzle and the gate opening 17 is closed. The outer mould 7 is usually kept at a lower temperature $\theta_T$, whereas the nozzle block 5, and thus the outlet area from the nozzle 1, are kept at a higher temperature $\theta_H$. After the nozzle needle 19 has been advanced according to FIG. 1b, the material in the nozzle 1 is separated from that pressed into the mould cavity 15, and it crystallizes. As may be seen in FIG. 1b, after the nozzle needle 19 has been closed, the core 9, the blank 29 and its runner 21 is lifted from the surface 11 of the outer mould 7 and the blank 29 is released (not shown) from the core 9.

In FIGS. 2a and 2b, the conditions in FIGS. 1a and 1b are shown as applied to the method according to the invention and to a gate system according to the invention, with corresponding parts bearing the same reference numerals as in FIG. 1. Instead of an axial displaceable needle 19, the nozzle chamber 3 carries, according to the invention, a stationary coaxial core 31 which projects into the outer mould 7 in the area between the nozzle chamber 3 and the gate opening 17. When PET material M, heated to fluidity, is pressed in, it flows all around the hot stationary core 31 and unites on the outer mould surface 11 only immediately before the outlet 33 from the gate opening 17. In contrast to the mobile connection 37 in FIG. 1b, a diagrammatical mechanical connection 35 shows that the core 31 moves rigidly with the nozzle 1.

Figure 2:
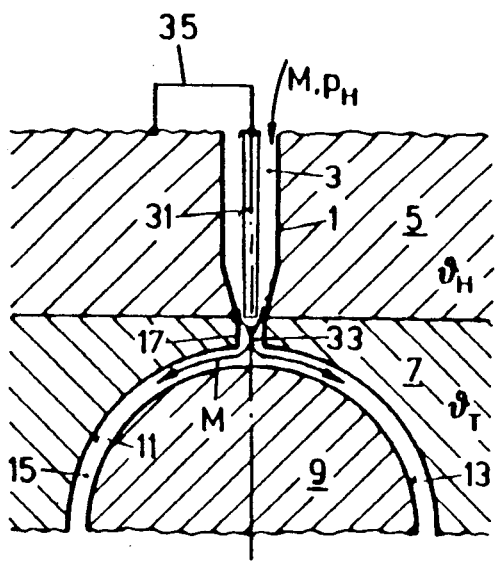
FIG. 2a is a diagrammatical representation according to FIG. 1 of a gate system according to the invention in the casting position.
FIG. 2b shows the gate system according to the invention upon removal of the blank with gate box.
Figure 2:
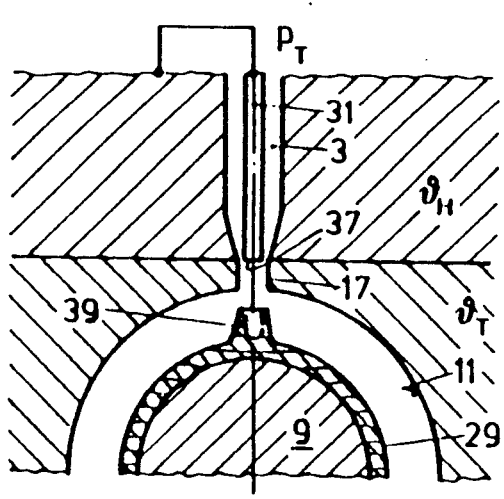

Whereas in the known method according to FIG. 1, after the mould 15 has been filled, the nozzle needle 19 closes off the passage from the nozzle chamber 3 to the mould cavity 15, and a pressure "p" can be maintained in the nozzle chamber 3. According to the present invention as shown in FIG. 2, after the mould cavity 15 has been filled, the pressure "p" in the nozzle chamber 3 is reduced from a pressure $p_H$, for applying pressure to the mould cavity 15, to a substantially lower restraining pressure $p_T$. After the mould cavity 15 has been filled and the pressure "p" in the nozzle chamber 3 has been reduced from a high pressure $p_H$ to low pressure $p_T$, the forward flow of material is halted, and the PET material which has been pressed into the mould cavity 15 cools down. Here again, the outer mould 7 is at a substantially lower temperature $\theta_T$ than temperature $\theta_H$ in the nozzle 1. Because the surface 37 of the stationary core 31 is also hot in the vicinity of the gate opening 17, a solid runner 21 is not formed, but rather a box runner 39 results. It may be seen in particular that the wall 25 of the blank 29, which is largely homogeneous over the gate area, is not crystalline, i.e., the blank 29 exhibits no material structural lack of homogeneity in the gate area which during the further processing or use could lead to problems, such as the formation of cracks under pressure.

According to FIG. 2a, the pressure $p_T$ is reduced after a predetermined length of time and the core 9, together with the blank 29 and the box runner 39, is lifted from the outer mould surface 11 and the gate opening 17. The relatively thin wall 41 of the box runner 39 releases itself immediately from the fluid PET material now under reduced pressure $p_T$, presumably also assisted by the relatively thin wall 41. Here again, the core 9 is then released (not shown) from the blank 29.

Thread drawing upon lifting the core 9 and the blank 29 from the outer mould surface 11 and the gate opening 17 does not take place.

Figure 4:
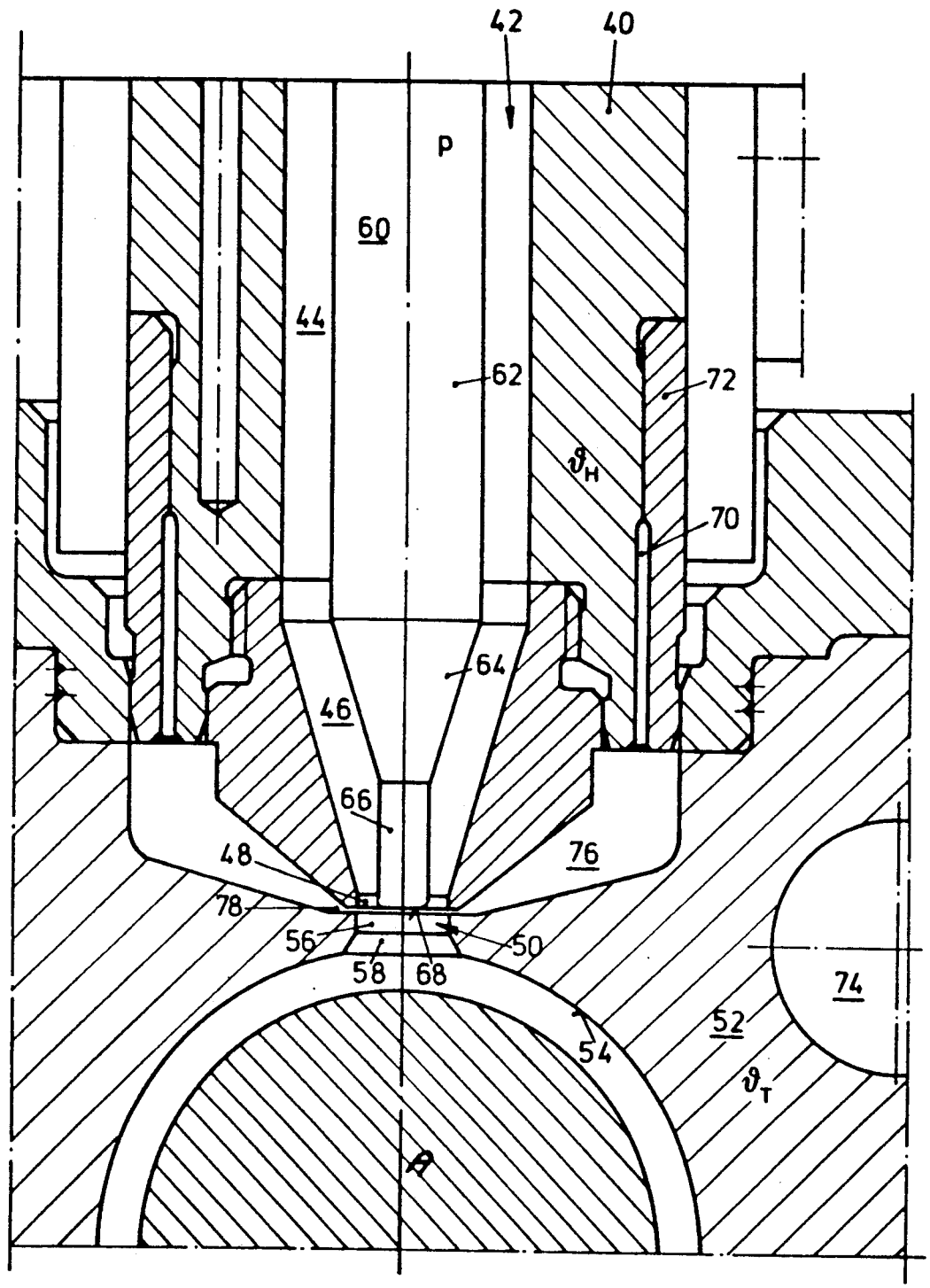
FIG. 4 is a preferred variant of a gate system according to the invention.

FIG. 4 shows a preferred and tested example of an embodiment of a gate system and nozzle according to the invention, using the method of the invention. Located in a nozzle body 40, made of a high grade tool steel, is a nozzle chamber 42 comprising, in the direction of flow, a first section 44, 10 mm in diameter, merging into a conical section 46. The latter merges into a short, cylindrical section 66, 3.7 mm in diameter, opening out into a gate opening 50 in an outer mould 52 having a surface 54. The opening 50 in the mould 52 comprises, an adjoining cylindrical section 48 of the nozzle outlet area, a cylindrical section 56, 3.8 mm in diameter, which merges into a conically expanding section 58 which finally opens out to the outer mould surface 54. In the example tested, the diameter of the outer mould surface 54 is 12 mm. Located coaxially in the nozzle chamber 42 is a core 60 which is stationary, i.e., is rigidly secured in relation to the nozzle body 40. In the vicinity of the cylindrical section 44 of the nozzle chamber 42, the core 60 is also cylindrical and comprises a section 62, 5.95 mm in diameter. In the vicinity of the transition from the cylindrical surface 44 to the conical surface 46, the core 60 also merges into a conical section 64, the casings of the conical surface 64 being preferably parallel with those of the conical surface 46 of the nozzle body 40. The conical surface 64 then merges into another cylindrical section 66, 2 mm in diameter, and extends to the transition between the cylindrical section 48 to the gate opening 50 in the outer mould 52 where it forms an end surface 68. Located between the cylindrical section 66 of the core 60 and the first conical and then cylindrical sections 46, 48 of the nozzle chamber 42 is a circular flow section, tapering towards the gate opening 50 for PET material in the nozzle chamber 42. Like the core 60, the nozzle body 40 is connected in good thermal conductivity with the hot block of the system. This makes it possible to keep the nozzle 40 as far as the outlet from cylindrical section 48, at a temperature $\theta_H$ of between 250° and 280° C.

The outer mould 52 is firmly connected to the nozzle body 40 by an insulating cylinder 72 made of a material of poor thermal conductivity such as stainless steel and additionally insulated by a cylindrical air gap 70. By means of a cooling water system 74, the outer mould 52, with its gate opening 50 may be kept at a temperature $\theta_T$ of between 5° and 10° C.

Figure 3:
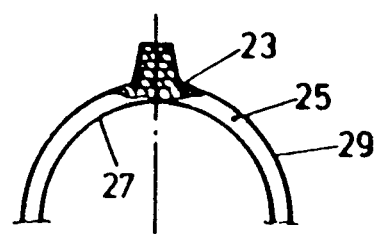
FIG. 3a shows part of the blank and runner produced by the known method shown in FIG. 1.
FIG. 3b shows a section of a blank with a gate box produced by the method of the invention according to FIG. 2.
Figure 3:
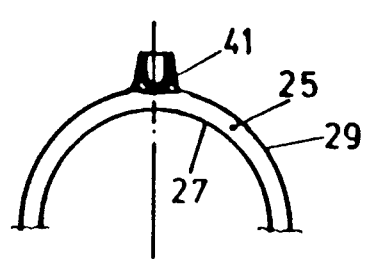

Located in the nozzle outlet area, i.e., immediately adjoining the cylindrical section 48 between the outer mould 52 and the wall of the nozzle body 40, is an outwardly extending disc-shaped gap 76. On the one hand, this gap 76 communicates with the flow duct for the material through a spacing slot 78 between the nozzle outlet and outer mould 52. On the other hand, it communicates with the insulating slot 70. Depending upon the temperature, the width of the slot 78 is between 0.24 and 0.5 mm. When the unit is in operation, PET material flows radially through the slot 78 into the gap 76, the poor heat conductivity of this material ensuring additional insulation between the outlet area of the nozzle 40 and that of the gate opening 50 in the outer mould 52. This variant of the gate system according to the invention was used to produce blanks shown in FIG. 3b in which the axial length of the box runner 41 is equal to or less than the outside diameter thereof. This produces a box runner 41, the separate removal of which may be omitted in many applications for the blank 29 and the preliminary blank 29.

The method of operation of a preferred and tested example of the embodiment of the gate system according to the invention is explained in greater detail hereinafter.

Because of the high crystalline melting temperature range of polyethylene terephthalate, the hot block, nozzle body 40 and the core 60 rigidly secured thereto are first brought to a temperature $\theta_H$ of between 265° and 285° C. In order to prevent spherolite formation and milky products, the melt must be forced down from its high processing temperature $\theta_H$ to below the minimal temperature for crystallization $T_{CH}$ or close to the $T_G$ glass transition temperature of the polymer.

To this end, the outer mould 52, and the core 9 of the inner mould, must be brought by the cooling system 74 to a temperature $\theta_T$ of between 5° and 8° C. The whole injection moulding installation is preferably operated in an air conditioned shop. In a first phase, the PET mass flows from the hot block into the nozzle chamber 42, along the hot walls of the nozzle chamber 42 and the nozzle core 60, and into the cold mould. Depending upon the delivery pressure, delivery temperature and mould capacity, the filling time amounts to between 2 and 6 seconds. In a second phase, the delivery pressure is increased over a further 6 to 7 seconds to between 800 and 1200 bars, preferably to 900 bars, in order to compensate for loss in the volume of the cooling mass. In a third phase, also called a holding phase, the increased pressure, preferably of 900 bars, is retained, preferably for a further 4 to 6 seconds, so that the PET material in the mould can cool and solidify still further. In a fourth phase, the pressure on the material is again relieved for several seconds so that, after the blank 29 has been separated, hot PET cannot flow from the nozzle 40, and to allow the material in the mould to cool and solidify still further during this time. To this end, because of the inherent resiliency of the PET material, a slight negative pressure must be applied to the feed side. Blanks of 48 g obtained with the tested installation according to the invention, have a tolerance of between 0.15 and 0.2 g.

An important point for the method and gate system according to the invention is that the cooling time for the moulding compound shall not exceed the time required for spherolite formation causing milkiness. However, since subsequently to the filling phase, the flow velocity of the PET compound in the zone between the hot compound and the compound cooled down to below the temperature of glass is greatly decelerated, there is a danger, during the second phase, of some of the PET remaining in this temperature range long enough for enough spherolite to form, and thus, cause milkiness.

According to the invention, this milkiness is prevented by minimalizing the critical temperature zone for spherolite formation. More particularly, because PET can penetrate into the disc-shaped gap 76 and spacing slot 78 between the nozzle mouth and the outer mould 52, the poor heat conductivity of the material is used to achieve satisfactory heat insulation between the outer mould 52 and the nozzle body 40, thus increasing the temperature gradients.

A final important point is the use of a hot nozzle core 60 which, because of the poor heat conductivity of PET, ensures that material in the core area of the casting strand is no cooler at the gate opening 50 than material in the edge area of this casting strand. In the tested example of the embodiment, use was made of a nozzle core 60 made of a copper alloy.

Another important step in minimalizing the zone in which the synthetic moulding compound is at a temperature at which it begins to crystallize consists in expanding the gate opening in the direction of the mould cavity.

It is obvious to an expert in the field of plastic technology to optimize the example of embodiment described hereinbefore, from the point of view of geometry, choice of material and dimensioning, for specific PET compounds and specific moulds. Cross sectionally star shaped configurations of nozzle outlets, and the use of ceramics or titanium alloys are definitely conceivable. In any case, the expert will take into account material parameters and material dependent behaviour in optimizing the geometry of the gate system.

It is obvious that the method according to the invention, and the corresponding gate system, may be used for all thermoplastic polymer compounds having a strong tendency to crystallization, i.e. crystallizable synthetic compounds.

The embodiments of the invention in which an exclusive property or privilege is claimed are defined as follows:

1. A method for injection molding hollow thermoplastic blanks suitable for subsequent inflation stretching which method employs a crystallizable synthetic thermoplastic polymer and comprises the steps of:
    a) heating the polymer to a temperature enabling it to flow under pressure;
    b) forcing the molten polymer under pressure from an injection molding nozzle into a cooled mold through a gate opening in the said mold to form a blank said molding nozzle and cooled mold mating at said gate opening for the transfer of heated polymer therebetween; and
    c) separating the blank from the molding nozzle at said gate opening with the formation of a separation runner on the blank;
wherein the mold is cooled to prevent polymer crystallization and the method further comprises:
    d) the use of an unclosable nozzle having a core around which the molten polymer can flow which nozzle core is heated to have a heated transverse polymer-engaging end face in the vicinity of said gate opening;
    e) depressurizing said polymer to interrupt polymer flow through said gate for separation of the blank; and
    f) holding said heated nozzle core stationary in relation to said nozzle during each of the aforesaid blank molding steps;
whereby the method provides a substantially clear blank with a substantially thread-free separation runner as it leaves the nozzle which blank is substantially free of polymer crystallization in the vicinity of said separation runner said separation runner being a box runner having a hollowed interior facing said end face of the nozzle core.

2. A method according to claim 1 wherein said depressurization includes the use of a negative pressure to prevent hot polymer flowing from the nozzle during blank separation.

3. A method according to claim 1 wherein the crystallizable thermoplastic polymer is polyethylene terephthalate.

4. A method according to claim 3 wherein the outer mold is cooled to from 5° to 8° C. before receipt of hot polymer therein.

5. A method according to claim 3 including filling the mold, increasing polymer delivery to from 800 to 1200 bars, holding said pressure for from 4 to 6 seconds for polymer cooling and solidification prior to said depressurization.

6. Apparatus for injection molding hollow thermoplastic blanks from a hot flowable, crystallizable synthetic thermoplastic polymer said blanks being suitable for subsequent inflation stretching, which apparatus includes:
    a heatable unclosable nozzle comprising an annular nozzle body having a nozzle tip through which said hot polymer can be forced under pressure and a nozzle core arranged within said nozzle body and having an end face in the vicinity of the nozzle tip said end face not protruding beyond said nozzle tip and defining with the nozzle tip a normally unclosable flow path for the hot polymer therebetween, at least said nozzle tip and said nozzle core having a high heat conductivity; heat source means connected to said nozzle tip and said nozzle core to maintain said nozzle tip interior and said nozzle core end face heated;
    a coolable mold assembly having an outer mold provided with a gate opening and an inner mold forming a mold cavity with said outer mold said gate opening being alignable with said nozzle to receive polymer therefrom into the mold cavity, said outer mold further having a high thermal conductivity region in the vicinity of the gate opening which region is connected to a heat sink to cool the mold;
    means to hold the nozzle core stationary relative to the nozzle tip during the molding of blanks; and depressurization means to interrupt the flow of hot polymer through said gate opening for the separation of a blank from the polymer stream;
wherein said end face and said gate opening define between them a cavity for the formation of a separation runner in the form of a box runner on said blanks said apparatus being operable to provide a substantially clear blank, formed with a substantially thread-free runner as it leaves said nozzle which blank is substantially free of polymer crystallization in the vicinity of said runner.

7. Apparatus according to claim 6 further comprising heat insulation means to insulate said nozzle tip to prevent heat flow to said outer mold.

* * * * *